United States Patent
Leutsch

(10) Patent No.: US 6,401,292 B1
(45) Date of Patent: *Jun. 11, 2002

(54) WIPER BLADE WITH METAL STRIP AS TILTING BAR

(75) Inventor: Wolfgang Leutsch, Buehlertal (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 27 days.

(21) Appl. No.: 08/899,989

(22) PCT Filed: Oct. 31, 1996

(86) PCT No.: PCT/DE96/02071

§ 371 (c)(1),
(2), (4) Date: Jul. 24, 1997

(87) PCT Pub. No.: WO97/21568

PCT Pub. Date: Jun. 19, 1997

(30) Foreign Application Priority Data

Dec. 13, 1995 (DE) .................................. 195 46 508

(51) Int. Cl.$^7$ ................................................ B60S 1/38

(52) U.S. Cl. ...................... 15/250.48; 428/598; 428/573; 15/245

(58) Field of Search ........................ 15/250.48, 250.361, 15/250.06, 245; 428/598, 573, 574, 575; 52/309.16, 717.03, 717.06

(56) References Cited

U.S. PATENT DOCUMENTS

| | | | | |
|---|---|---|---|---|
| 2,634,467 A | * | 4/1953 | Astrella | 52/717.03 |
| 2,797,428 A | * | 7/1957 | Wallis | 15/250.452 |
| 3,461,477 A | * | 8/1969 | Ikner | 15/250.48 |
| 3,718,940 A | * | 3/1973 | Bode | 15/250.48 |
| 5,459,900 A | * | 10/1995 | Mege et al. | 15/250.48 |
| 5,563,670 A | * | 10/1996 | Samples | 15/250.48 |

FOREIGN PATENT DOCUMENTS

| | | | | |
|---|---|---|---|---|
| DE | 3527093 C2 | | 12/1989 | |
| GB | 1054389 | * | 1/1967 | 52/717.06 |

* cited by examiner

Primary Examiner—Gary K. Graham
(74) Attorney, Agent, or Firm—Michael J. Striker

(57) ABSTRACT

The invention relates to a wiper blade with a wiper head (1), wiper lip (2) and a connecting tilting bar. It is distinguished in that the wiper head (1) and the wiper lip (5) consist of at least one elastomer, and the connecting tilting bar is an elastic, resilient metal strip (4).

7 Claims, 2 Drawing Sheets

WIPER BLADE WITH METAL STRIP AS TILTING BAR

This application is a 371 of PCT/DE96/02071

BACKGROUND OF THE INVENTION

The invention relates to a wiper blade, in which a metal strip is used as the tilting bar, as well as to the metal strip itself.

Wiper blades for motor vehicles or aircraft are subjected to great mechanical stresses, on the one hand because of dust, insect pieces and other hard dirt particles, which roughen the glass surface to be cleaned, and on the other hand by the tilting stress, which during the wiping process continuously changes directions, and is constant in the rest position because of the continuing contact pressure with the glass panel. Added to the mechanical stresses are chemical and environmental effects, for example because of ozone, oil and alcohol and/or detergents in the windshield washer fluid.

Wiper blades with appropriate profiles (or cross sections) are as a rule continuously produced by means of extrusion or co-extrusion of vulcanizable polymer mixes. Following extrusion, the ropes are vulcanized to form elastomers and are cut to the required length. The wiper blades have a wiper head (also called base element or back), by means of which the wiper blade is fastened in the hoop system of the windshield wiper. On its side facing the glass panel, the wiper head makes a transition into a tilting bar, which is also called neck, hinge or folding bar, and which connects the wiper head with the wiper lip. In actual operation of the windshield wiper, the latter acts as the actual functional element of the wiper blade and keeps the glass pane clear of water. The tilting bar is the portion of the wiper blade which is mechanically stressed the most and as a rule determines the service life of the wiper blade. When produced by means of the extrusion or co-extrusion process mentioned, it consists of an elastomeric polymer material. Depending on the height of the tilting bar and the design of the surfaces of the wiper head and the wiper lip, which are located opposite each other, the main cross-sectional axis of the wiper lip can diverge in the position of rest by up to 45° from the vertical line on the glass panel. In the operational state the wiper lip follows the wiper head, because of which a tilting movement is required at each direction change. Therefore the main cross-sectional axis of the wiper lip (vertically on the glass surface in the state where it is not pressed against it) continuously changes its position during operation by approximately ±45°.

The elastomers of which the wiper blades customarily are made are created from vulcanizable mixtures of natural or synthetic polymers or copolymers, which are vulcanized with organic peroxides and/or sulfur to form an elastomer. Wiper blades made of only one elastomeric material, namely caoutchouc, or of a mixture of caoutchouc and chloroprene rubber, or of caoutchouc and a rubber of the diene type, such a butadiene rubber or styrene rubber, are mentioned as being part of the prior art, for example in DE-C2 35 27 093. Caoutchouc and other types of diene rubber also contain olefinic double bonds and are therefore sensitive to ozone. The tendency to ozonolysis, along with the formation of cracks, can be reduced by a treatment with a hypochlorite solution ("chlorination"). But chlorination is damaging to a tilting bar made of caoutchouc and other rubber types of the diene type, because under continuous pressure stress it encourages permanent plastic deformation. The wiper blade is subject to such a stress both in the position of rest and in operation, because it is continuously pressed against the glass pane.

The wiper blade in accordance with the invention in DE-C2 35 27 093 essentially consists of another material, namely EPDM rubber, a mixed polymer of ethylene, propylene and a diene, which is vulcanized with peroxides. However, the elastic properties of EPDM rubber depend to a considerable degree on the temperature, the same as the previously mentioned elastomers. In blowing snow and at temperatures below the freezing point, EPDM rubber also becomes increasingly brittle and is then no longer a match for the changing tilting movements. Furthermore, EPDM rubber is not impervious to the desired degree to chemicals and working materials, such as fuels or oil, which swell the rubber and soften it, which leads to a premature wear of the wiper blade lip and encourages plastic deformations.

SUMMARY OF THE INVENTION

Accordingly, it is an object of the present invention to provide a wiper blade which avoids the disadvantages of the prior art.

In keeping with these objects and with others which will become apparent hereinafter, one feature of present invention resides, briefly stated, in a wiper blade in which the wiper head and the wiper lip are composed of at least one elastomer, and the connecting tilting bar is an elastic, resilient metal strip.

The highly stressed metal strip as the tilting bar, which determines the function and service life of the wiper blade, is completely impervious to chemical and environmental effects, such as occur when it is used in accordance with its purpose. The metal strip does no show aging under the effects of ozone, visible light or UV radiation, and no plastic deformation under pressure strain. Therefore wiper blades in accordance with the invention remain functional for a longer time than wiper blades with elastomeric tilting bars in accordance with the prior art. The elastic properties of the metallic tilting bars are furthermore practically independent of the outside temperature.

DESCRIPTION OF PREFERRED EMBODIMENT

Figure 3:
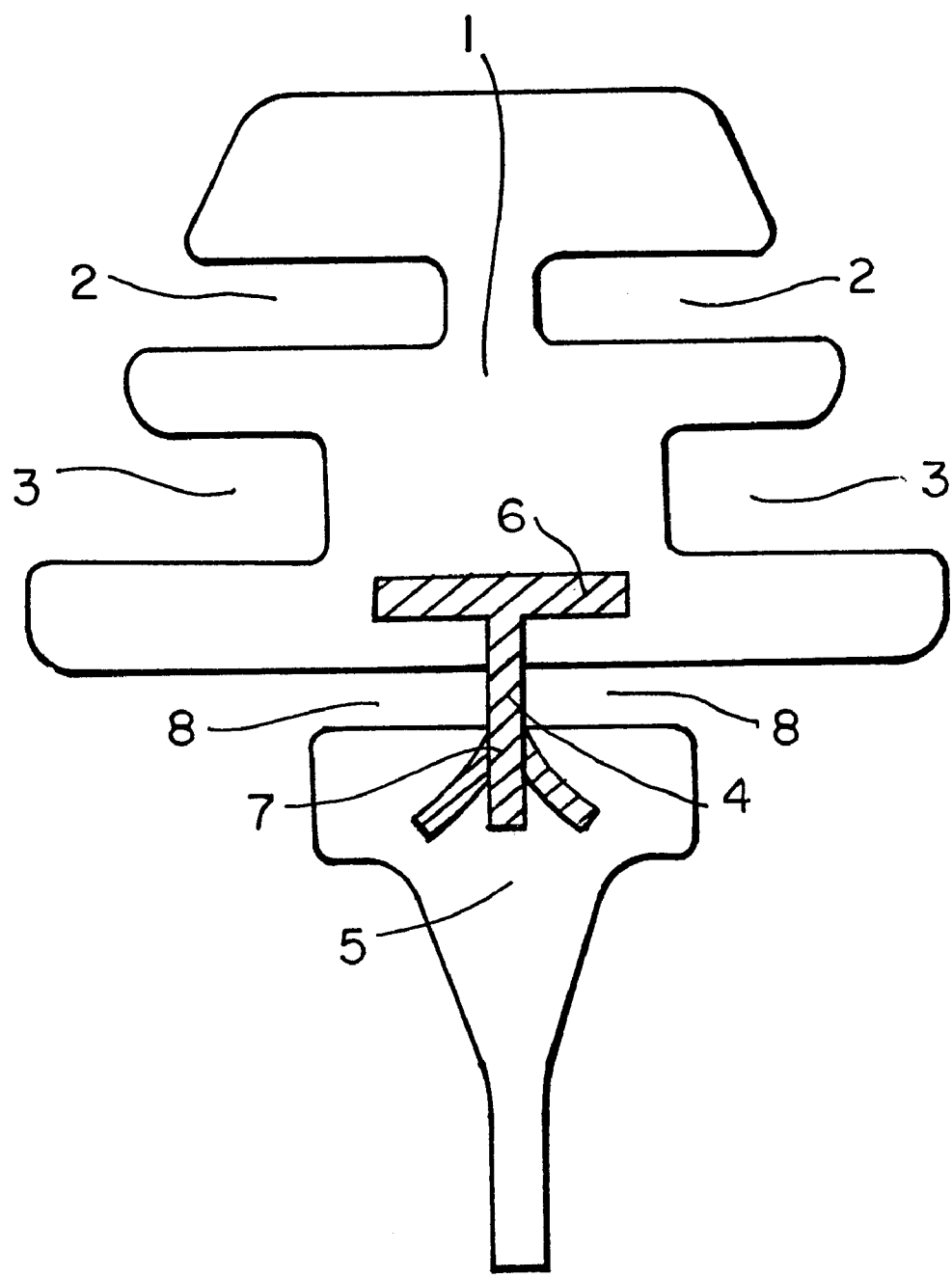

FIG. 3 shows a further embodiment of the invention.

Figure 1:
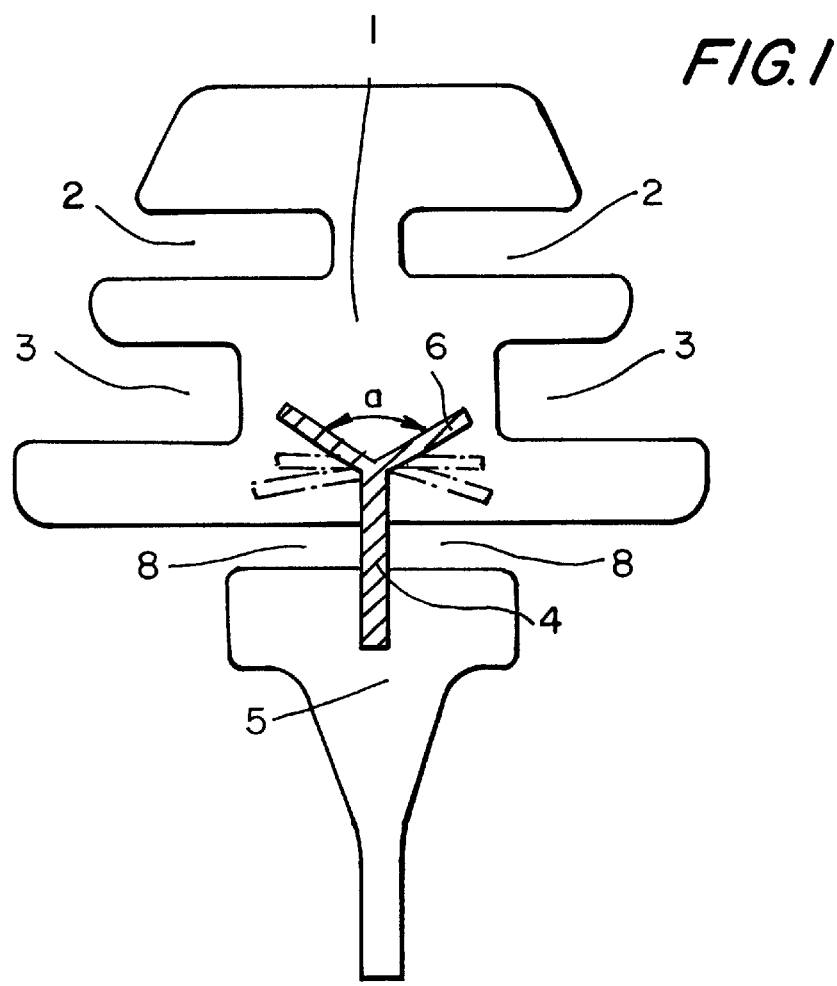
FIG. 1 represents a cross section through a wiper blade with a metal strip in accordance with the invention.

In a wiper blade in accordance with the present invention the wiper head (1), the recesses (2) which receive the metallic spring bars (not represented), the recesses (3) for the claws (also not represented) of the metal hoop, the T-shaped elastically resilient metal strips (4) constituting the tilting bar, and the wiper lip (5) can be seen in FIG. 1, a cross section through a wiper blade in accordance with the invention.

Figure 2:
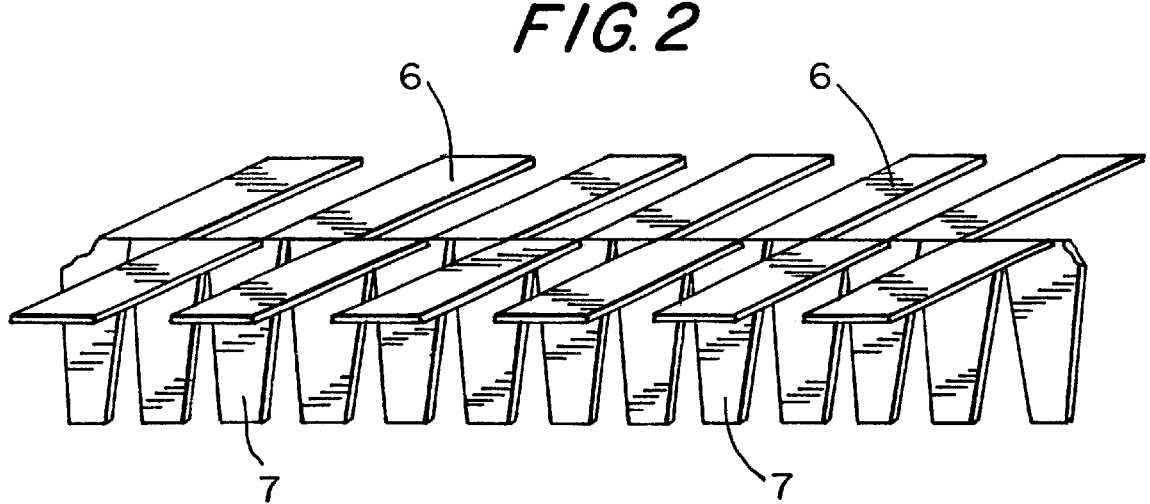
FIG. 2 is a perspective representation of an embodiment of the metal strip, such as can be employed in wiper blades in accordance with the invention.

An essential characteristic of the wiper blades in accordance with the invention is the elastic, resilient metal strip (4). An example of such a metal strip is represented in FIG. 2. The flat elements (6) are essentially located in one plane. "Essentially" means that oppositely located flat elements (6), which extend in the opposite direction, should form an angle, which is not too different from 180°, for example, which lies in the range between 135° to 225°. The flat elements (6) alternatingly extend to the right and left and in this way anchor the metal strip (4) securely in the wiper head (1).

In the embodiment shown, the flat elements (7), which stand vertically on the common plane of the flat elements (6), are of the same width as the flat elements (6), and are offset in respect to them in the longitudinal direction of the metal strip (4), usefully by approximately half an element width. The flat elements (7) extend downward into the wiper lip (5), are exposed in the space (8) between the wiper head (1) and the wiper lip (5) and develop their elastic, resilient properties there during the operation of the wiper. For an improved anchoring of the flat elements (7) in the wiper lip (5) it is possible to provide, for example, circular or rectangular recesses (9) in the portion of these elements which are enclosed by the wiper lip (5). For the same purpose the flat elements (7) can also alternatingly be bent outward to the right and left in the portion enclosed by the wiper lip (5). It is of course also possible to provide the flat elements (6) in a corresponding manner with recesses and/or to bend their outer ends.

The metal strip (4) advantageously is made of stainless special steel or another suitable, corrosion-resistant, elastic and resilient material. It is dimensioned to correspond with the size of the wiper blade. Generally the thickness of the flat elements (6) and (7) is 0.15 mm to 0.8 mm, in particular 0.15 mm to 0.4 mm, depending on the employment of the wiper blade (car, truck, aircraft). As a rule, the flat elements (6) and (7) are 1 to 3 mm, in particular 1 to 3 mm, long and and 1 to 5 mm, in particular 1 to 3 mm wide, again depending on their employment. Generally 0.5 to 3 mm, in particular 0.7 to 1.5 mm, are allotted to the exposed portion of the flat elements (7) in the space (8).

The metal strip (4) must have a certain flexibility, both parallel with and vertically to the glass pane, so that the wiper lip (5) can be adapted to the geometry of the mainly curved glass panes. This flexibility is provided in the embodiment in accordance with FIG. 2 with the recited dimensions. One skilled in the art in the field of sheet metal processing would easily be capable of developing other practical embodiments. Metal strips in accordance with FIG. 2 can be usefully manufactured in automatic stamping and bending machines, wherein initially the flat elements (6) and (7) and, if desired, the recesses in these elements, are stamped out and the stamped sheet metal is then bent.

There are no differences from the wiper blades of the prior art regarding the materials, from which the wiper head (1) and the wiper lip (5) of the wiper blades in accordance with the invention are made, or regarding the geometry of the profiles (or of the cross section). Thus, the wiper head (1) and the wiper lip (5) are made from elastomeric materials, such a caoutchouc or other rubber types of the diene type, for example polybutadiene rubber, polyisoprene rubber, polychloroprene rubber, styrene-butadiene rubber and alcylnitrile-butadiene rubber, or from copolymers of dienes and other olefinic monomers, such as vinyl acetate, acryl butylate, ethylene, propylene and 1-butane. A suitable elastomeric copolymer of the last mentioned type is, for example, the mentioned EPDM rubber.

The wiper blades in accordance with the invention can be manufactured by extrusion or co-extrusion of vulcanizable mixtures around the metal strip (4). The extrudate is then vulcanized in heat and the hardened ropes are cut to the desired size. These techniques are well known to one skilled in the art. The vulcanizable mixtures can contain customary additives, for example sulfur, thiuram disulfide, organic peroxides, such as dicumyl peroxide, as well as carbon black, zinc oxide and other fillers, heat and oxidation stabilizers, lubricants and other agents.

What is claimed is:

1. A wiper blade, comprising a wiper head; a wiper lip; a connecting tilting bar which connects said wiper head with said wiper lip, said wiper head and said wiper lip being composed of at least one elastomer, said tilting bar being formed as an elastic, resilient metal strip, said metal strip having a T-profile and including a first plurality of flat elements which are located in a common plane and alternatingly extend in opposite directions so as to anchor said metal strip in said wiper head, said metal strip having a second plurality of flat elements which are located in a common plane extending perpendicular to said first mentioned common plane and offset relative to said first plurality of flat elements in a longitudinal direction of said strip so as to extend also into said wiper lip and to anchor said metal strip in said wiper lip.

2. A wiper blade as defined in claim 1, wherein said metal strip is composed of stainless steel.

3. A wiper blade as defined in claim 1, wherein said flat elements of said second plurality of said flat elements have recesses for a better anchoring of said metal strip in said wiper lip.

4. A wiper blade as defined in claim 1, wherein said flat elements of said second plurality of flat elements are alternatingly bent in different directions for a better anchoring of said metal strip in said wiper lip.

5. A wiper blade as defined in claim 1, wherein said wiper head and said wiper lip are composed of a material selected from the group consisting of a same elastomer and a same elastomeric mixture.

6. A wiper blade as defined in claim 1, wherein said wiper head and said wiper lip are composed of a material selected from the group consisting of different elastomers and different elastomer mixtures.

7. A metal strip for use as a tilting bar in a wiper blade, comprising a T-profile; a first plurality of flat elements originating at a geometrical location of meeting places of two T bars which correspond to a horizontal T-bar and lie essentially in a common place so as to alternatingly extend to right and left, and a second plurality of flat elements which originate at a geometric location of meeting places of two T-bars which correspond to a vertical T-bar and stand vertically on said essentially common plane of said first plurality of flat elements so that the flat elements of said second plurality of flat elements are offset in respect to said flat elements of said first plurality of flat elements in a longitudinal direction of the strip and extend downward.

* * * * *